(12) United States Patent
Alelyunas (10) Patent No.: US 8,965,135 B2
(45) Date of Patent: Feb. 24, 2015

(54) FLEXIBLE CADENCE FOLLOWER FOR FILM IN VIDEO

(75) Inventor: Carl Alelyunas, Portland, OR (US)

(73) Assignee: Conexant Systems, Inc., Irvine, CA (US)

( * ) Notice: Subject to any disclaimer, the term of this patent is extended or adjusted under 35 U.S.C. 154(b) by 1824 days.

(21) Appl. No.: 12/051,475

(22) Filed: Mar. 19, 2008

(65) Prior Publication Data

US 2009/0238471 A1    Sep. 24, 2009

(51) Int. Cl.
*G06K 9/68* (2006.01)
*H04N 7/01* (2006.01)

(52) U.S. Cl.
CPC .................................. *H04N 7/0115* (2013.01)
USPC ...... 382/218; 375/240.16; 348/459; 348/558; 348/526; 348/443

(58) Field of Classification Search
CPC ......... G06K 9/68; H04N 7/012; H04N 5/144; H04N 7/0115; H04N 7/0112; H04N 5/142
USPC ......... 375/240.26, 240.16; 382/218; 348/459, 348/558, 526, 443, 701, 448, 452, 700, 441
See application file for complete search history.

(56) References Cited

U.S. PATENT DOCUMENTS

| | | | | |
|---|---|---|---|---|
| 5,398,071 A | * | 3/1995 | Gove et al. | 348/558 |
| 5,606,373 A | * | 2/1997 | Dopp et al. | 348/459 |
| 6,055,018 A | * | 4/2000 | Swan | 348/448 |
| 7,075,581 B1 | * | 7/2006 | Ozgen et al. | 348/448 |
| 7,286,269 B2 | * | 10/2007 | Matskewich et al. | 358/3.26 |
| 2006/0072036 A1 | | 4/2006 | Wyman | |
| 2007/0188662 A1 | * | 8/2007 | Winger et al. | 348/701 |
| 2008/0068497 A1 | * | 3/2008 | Lee et al. | 348/448 |
| 2009/0190030 A1 | * | 7/2009 | Nix et al. | 348/452 |

* cited by examiner

*Primary Examiner* — Jamal Javaid
(74) *Attorney, Agent, or Firm* — Haynes and Boone, LLP (57) ABSTRACT

A system for cadence break detection is provided. The system includes a field system receiving a plurality of fields of image data. A threshold system generates a cadence break signal if a difference in two fields exceeds a predetermined threshold. A sequence system generates the cadence break signal if a sequence of differences between the plurality of fields does not match a predetermined sequence.

18 Claims, 5 Drawing Sheets

FIGURE 1

FIGURE 3 SYSTEM INTEGRATION BLOCK DIAGRAM 300

FLEXIBLE CADENCE FOLLOWER FOR FILM IN VIDEO

FIELD OF THE INVENTION

The invention relates to cadence following, and more specifically to a method and apparatus for flexible cadence following for film in video that detects when a break in cadence has occurred prior to generation of undesirable image artifacts.

BACKGROUND OF THE INVENTION

Cadence refers to the tracking of fields that are used to convert film, which is typically 24 frames per second, to video, which is typically 60 frames per second. Each frame of the film is first converted into two fields, one consisting of even lines and the other consisting of odd lines. The 48 fields are then mapped to video using a predetermined sequence, such as A0, A1, B0, B1, B0, C0, C1, D0, D1, D0, where "A" through "D" represent the original frames of the film and "0" and "1" represent the different field types. The film data is then combined by a video processor to generate video. This sequence is known as 3:2 pull-down, and other sequences can alternatively be used.

Simple cadence following is easy to implement. A counter is incremented at the end of every field, and it is reset to zero after the total number of fields in the sequence have passed. In the case of 3:2 pull-down, the counter counts from zero to four, and is reset to zero. Because the counter free-runs, there is no need to manually reset it. The counter selects a bit from a bitmap that determines whether the current field is merged with the future field or the past field.

The problem with simple cadence following is that the artifacts associated with broken cadences are egregious, where the artifacts associated with dropping from film-mode are not very apparent. As such, a simple cadence follower often results in poor video quality.

SUMMARY OF THE INVENTION

The current invention provides a flexible cadence follower for film in video that detects breaks in cadence within one frame, so that the processor can switch from film to video mode before noticeable image artifacts are generated.

In accordance with an exemplary embodiment of the present invention, a system for cadence break detection is provided. The system includes a field system receiving a plurality of fields of image data. A threshold system generates a cadence break signal if a difference in two fields exceeds a predetermined threshold. A sequence system generates the cadence break signal if a sequence of differences between the plurality of fields does not match a predetermined sequence.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
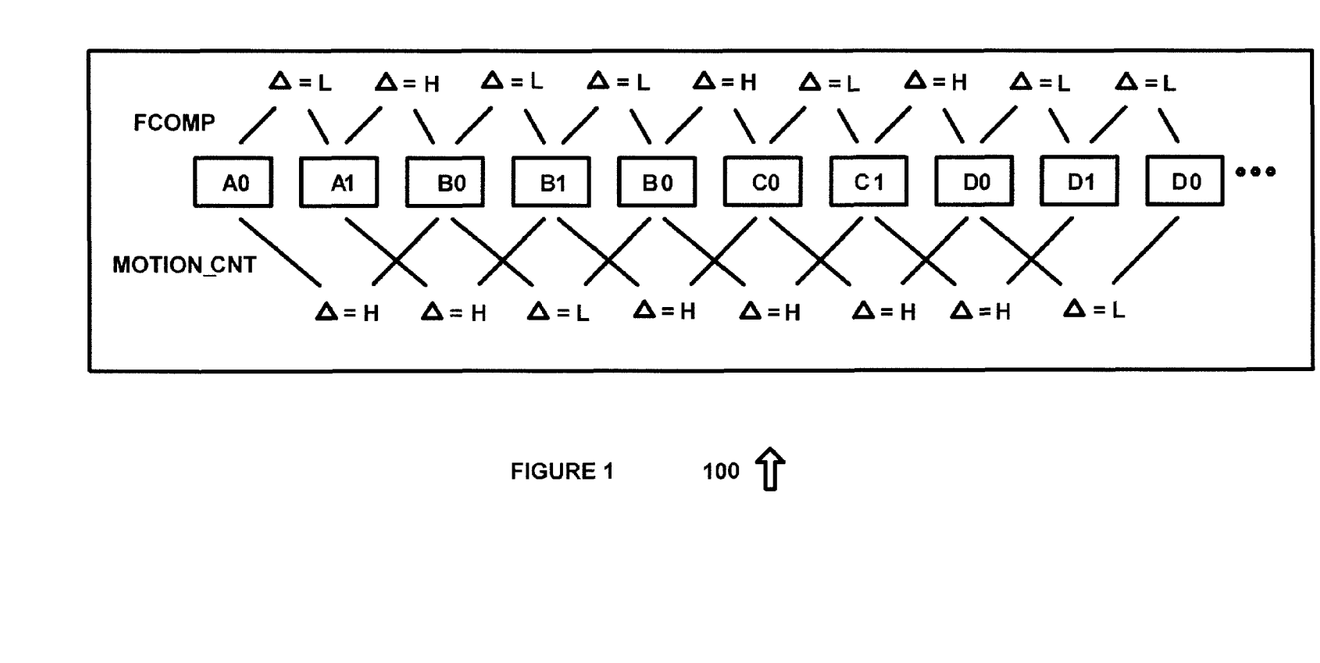
FIG. 1 is a diagram of a process flow in accordance with an exemplary embodiment of the present invention.

FIG. 1 is a diagram of a process flow 100 in accordance with an exemplary embodiment of the present invention. Process flow 100 demonstrates a cadence following process for detecting a break in cadence in a film mode cadence follower.

Process flow 100 demonstrates a cadence break detection process for a 3:2 pull-down sequence, such as where film at 24 frames a second is converted to video at 60 frames a second. In process flow 100, the 24 frames of film have been converted to two fields of alternating even and odd lines, designated by 0 and 1. In order to detect a cadence break, two comparisons are made. The first comparison involves a first field such as A0 and a second field such as A1 from the same frame of film, and the second comparison involves a field of a first film frame such as A0 and a field of a second film frame such as B0. As shown in FIG. 1, the comparison between field A1 and field A0 will result in a delta figure that is low, such as where the absolute value of a pixel subtracted from the average of the adjacent pixels in the previous and following rows is determined and the difference values are summed for each pixel in the fields. For example, the first field can have lines N and N+1 with pixel locations 1, 2 . . . Y, and the second field can have line M with pixel locations 1, 2, . . . Y, where the lines N and N+1 are adjacent to line M in the following manner:

| LINE | PIXEL LOCATIONS |
|---|---|
| N | 1 2 3 4 5 6 . . . Y |
| M | 1 2 3 4 5 6 . . . Y |
| N + 1 | 1 2 3 4 5 6 . . . Y | such that the difference between two fields is determined by adding the difference for all lines from 1 to Z in the two fields in accordance with the following equation $$\text{Line difference} = \sum_{1}^{Y} |(N(x) + N + 1(x))/2 - M(x)|$$

$$\text{Field difference} = \sum_{1}^{Number\_of\_lines} \text{line\_difference}(Z)$$

Other suitable processes can also or alternatively be used.

Likewise, the difference between field A0 and field B0 will result in a large value, such as where the number of corresponding pixels having different values between the two fields is determined or in other suitable manners. The difference between adjacent fields is designated FCOMP and the difference between adjacent frames is indicated as MOTION_CNT.

As shown in FIG. 1, the sequence for FCOMP for a 3:2 pull-down will typically run low, high, low, low, high, low, high, low, low, and so forth, which follows from the 3:2 pull-down sequence. Likewise, the sequence for the MOTION_CNT figure will typically run high, high, low, high, high, high, high, low, and so forth, which is a result of the 3:2 pull-down sequence. Because these sequences can be determined for any suitable pull-down sequence, such as 2:2, 2:2:3:2:3, or other suitable sequences, the expected sequence of high and low values for frames can be determined and used to determine if a break in cadence has occurred.

Figure 2:
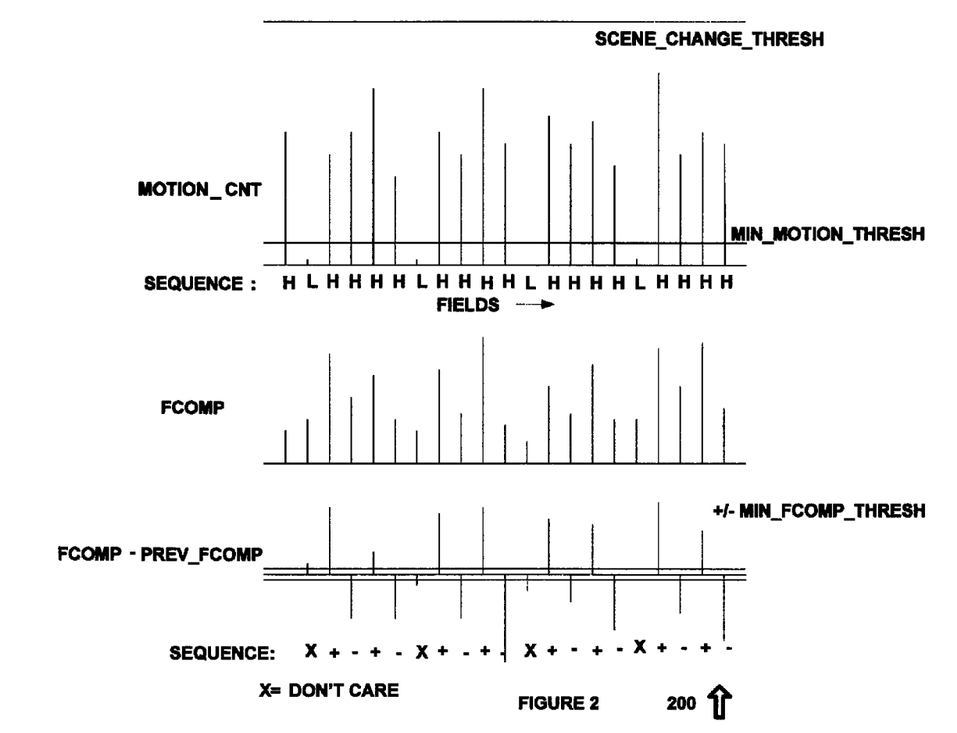
FIG. 2 is a diagram of field and frame comparison values in accordance with an exemplary embodiment of the present invention.

FIG. 2 is a diagram of field and frame comparison values in accordance with an exemplary embodiment of the present invention. As shown in FIG. 2, the value of the MOTION_CNT amount can be based on a number of corresponding pixels from two fields in subsequent frames that have different values, and varies within a range between a minimum motion threshold and a scene change threshold. In one exemplary embodiment, the scene change threshold and the minimum motion threshold can be determined empirically and based on the resolution of the video. For example, if the resolution of the video is 720 pixels by 240 pixels, the scene change threshold can be set to 57,600, where one-third of the pixels in an image changing significantly would indicate a scene change. In another exemplary embodiment, the minimum motion threshold can be set to a value of 200, such as where more than 200 pixels changing would signify the threshold has been exceeded.

Setting a lower threshold will result in a more sensitive cadence break indication, sometimes resulting in a cadence break indication where a cadence break has not occurred, whereas setting a higher threshold may result in the failure to detect a cadence break where one has occurred. For a standard sequence, there will be four high values between each low value, such that if a high value occurs where a low value is expected, it can also be determined that a break in cadence has occurred. Likewise, when the MOTION_CNT value exceeds a scene change threshold, it can be determined that a break in cadence has occurred, such as where the maximum expected variation between fields or frames for a given scene change is exceeded, indicating a break in cadence.

Likewise, the values of FCOMP can be seen to vary, so that in order to determine whether a break in cadence has occurred the values of FCOMP are compared to previous values of FCOMP. When this is done, it can be seen that the values of FCOMP alternate from a positive to a negative value, where the value for the difference is unimportant every fifth frame. The reason for the unimportant values is that the values could be either negative or positive such that the difference is not determinative of a break in cadence.

In operation, the values for MOTION_CNT and FCOMP can be used to detect a break in cadence by either determining that the value for the MOTION_CNT has exceeded a minimum motion threshold when it should be low or that it has exceeded a scene change threshold that is higher than the expected value of MOTION_CNT. Likewise, the values for FCOMP can be used to determine a sequence of alternating positive and negative values, such that a break in cadence can be detected if the sequence varies from the expected sequence. By using a hardware system for processing this information, a break in cadence can be detected quickly and does not require software operating on a video processor controlled chip to access the registers of each field after an interrupt and write values to registers before the next field starts, which results in potential for a large number of frames to be generated after a cadence break occurs, such that undesirable image artifacts are generated. The process can also be implemented in software, such as on a dedicated processor, using a processor that allows certain processes to proceed without interruption, or on other suitable processors.

Figure 3:
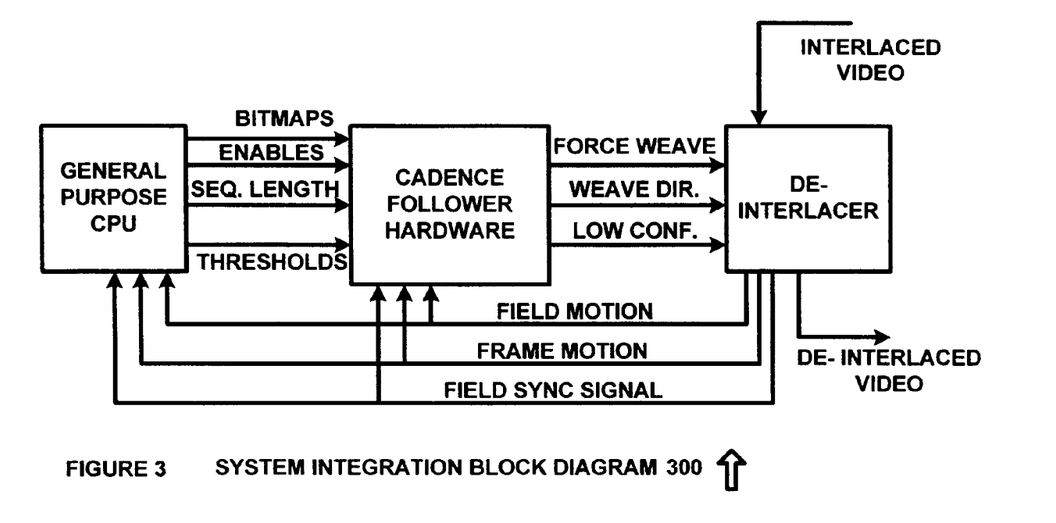
FIG. 3 is a diagram of a system for a cadence follower circuit in accordance with an exemplary embodiment of the present invention.

FIG. 3 is a diagram of a system 300 for a cadence follower circuit in accordance with an exemplary embodiment of the present invention. The CADENCE FOLLOWER HARDWARE and DE-INTERLACER can be implemented in hardware, software or a suitable combination of hardware and software, and can be one or more discrete hardware systems. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 300 can be used in a complete film cadence detection and following system. A general purpose CPU or other suitable systems can use the FIELD MOTION and FRAME MOTION signals to determine the cadence length and sequence according to a suitable algorithm. In one exemplary embodiment, if the cadence is determined to be a standard 3:2 pull-down cadence, the sequence length will be 5. The bitmaps are then constructed to provide the proper sequence of weave direction, which of those fields in the sequence are expected to exceed the frame motion threshold, and which of those fields in the sequence should exhibit positive change in field motion from the previous field, as previously discussed.

In the case of the 3:2 pull-down sequence, such as that shown in FIG. 1 starting with the field labeled A1, the bitmap representing weave direction will be 0,1,x,0,1 where 0 represents using the previous field for weaving (e.g., the A0 field and the A1 field), 1 represents using the future field for weaving (e.g., the first B0 field and the B1 field), and x represents using either the previous or future field for weaving (e.g., the first B0 field and the B1 field, or the B1 field and the second B0 field). The bitmap for frame motion will be 0,0,1,0,0 where 0 represents that the frame motion can exceed a threshold and 1 represents that the frame motion must be smaller than that threshold. The bitmap for field motion change will be 1,0,x,1,0 where 1 means that the change in field motion should be positive, 0 means that the change in field motion should be negative, and x implies that the change can either be negative or positive.

Upon determining that there is a cadence present in the sequence of video fields, and upon receiving the FIELD SYNC SIGNAL, the CPU writes the bitmaps and enables to the CADENCE FOLLOWER HARDWARE to cause the DE-INTERLACER to begin weaving the video.

The DE_INTERLACER creates the interstitial lines of an interlaced image using some combination of vertical interpolation and weaving. Weaving is the selection of the previous or future field's data for the interstitial lines. The FORCE_WEAVE signal overrides the DE-INTERLACER's internal decision process for every pixel in an entire field, and forces using the weave process for generating the interstitial lines. The WEAVE_DIRECTION signal indicates whether the DE-INTERLACER uses the future field or the previous field for those lines. The CADENCE FOLLOWER HARDWARE also generates a LOW_CONFIDENCE signal that indicates to the DE-INTERLACER that there is not enough information to determine that the cadence is either continuous or broken. In the LOW_CONFIDENCE case, the DE-INTERLACER will typically use its own weave versus interpolation decision hardware for that field, but can have an additional state of processing.

Figure 4:
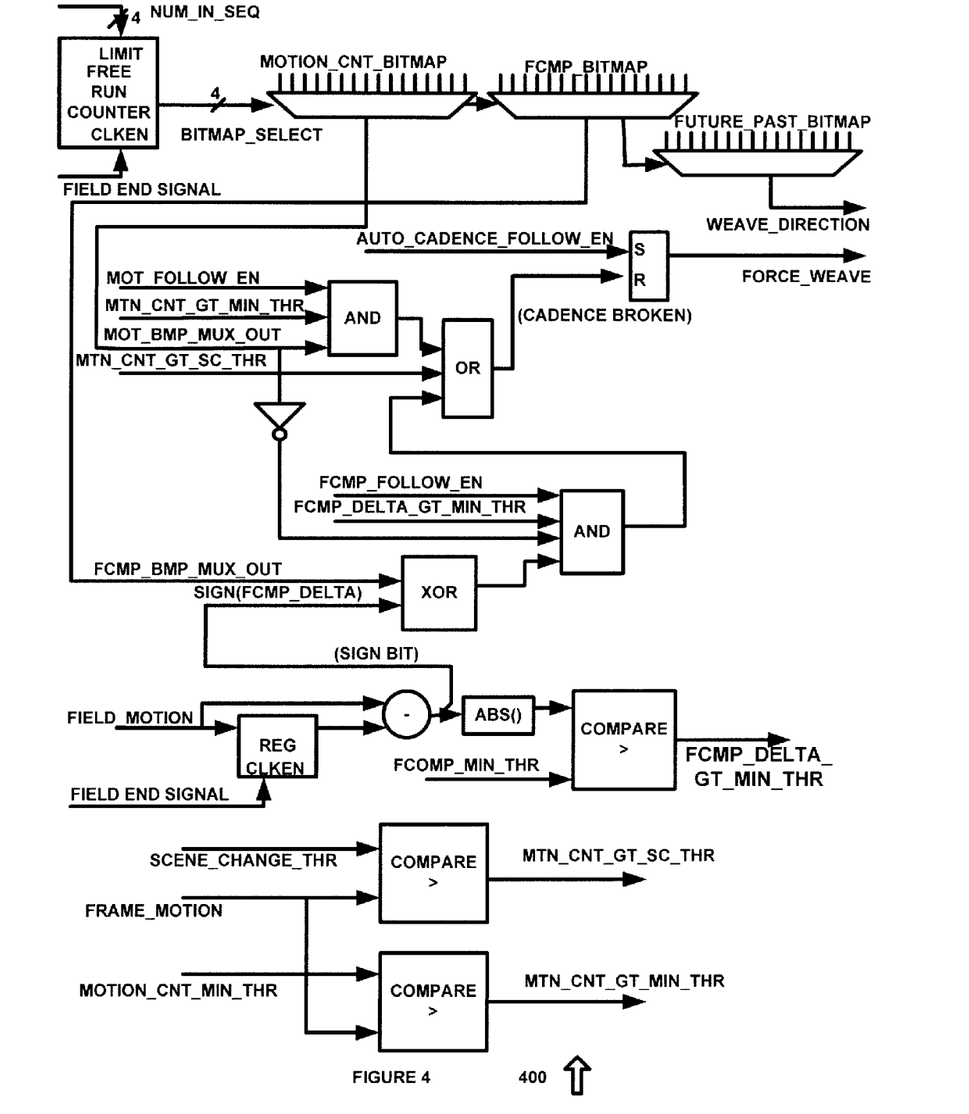
FIG. 4 is a diagram of a cadence following circuit in accordance with an exemplary embodiment of the present invention.

FIG. 4 is a diagram of a cadence following circuit 400 in accordance with an exemplary embodiment of the present invention. The FREE-RUN COUNTER increments once per field time, keeping track of the index of the field in the cadence sequence. It resets to zero when the NUM_IN_SEQ value is reached. This count selects one value from each of the three bitmap multiplexers. The FUTURE_PAST_BITMAP indicates whether the future field or the past field is woven into the current field in the DE-INTERLACER. The MOTION_CNT_BITMAP indicates whether the frame motion is expected to be high on this field, and the FCOMP_BITMAP indicates whether the change in field motion in this field is expected to be negative or positive on this field.

The FORCE_WEAVE signal forces the DE-INTERLACER to weave rather than interpolate. The AUTO_CADENCE_FOLLOW_EN signal from the CPU starts the cadence following function, which sets the FORCE_WEAVE signal true. The FORCE_WEAVE signal is reset by the cadence being broken, which happens when any one of the three following conditions are true:

1) (MTN_GT_SC_THR): The FRAME_MOTION (number of pixels that differ between the current field and two fields previous) is greater than the SCENE_CHANGE_THR (scene change threshold). This indicates a scene change, thus the film cadence is very likely to be broken. False negatives are better than false positives when forcing a weave condition in a DE-INTERLACER, so it is better to break the cadence on any scene change to be safe.

2) MTN_CNT_GT_MIN_THR AND MTN_BMP_MUX_OUT: FRAME_MOTION is greater than MOTION_CNT_MIN_THR (minimum threshold for which motion has been determined to happen), and the MOTION_CNT_BITMAP position indicated by the BITMAP_SELECT is true. When this condition is true, the frame motion has gone high when it is expected to be low, indicating that the cadence has broken.

3) FCMP_DELTA_GT_MIN_THR AND MTN_BMP_MUX_OUT AND (FCMP_BMP_MUX_OUT XOR SIGN(FCMP_DELTA)): The change in field motion from the previous field is greater than a threshold, the frame motion is expected to be high and the current FCMP_BITMAP position is different than the sign of the change in field motion. This indicates that the field motion is expected to get smaller and it gets larger, or vice-versa, indicating that the film cadence has broken. This is only relevant when the frame motion is expected to be high; when the frame motion is low, the change in field motion will be indeterminate.

Figure 5:
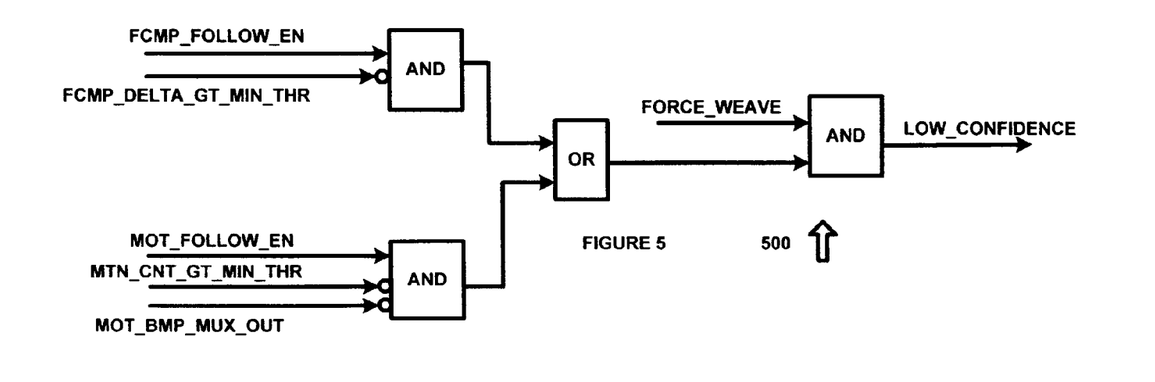
FIG. 5 is a diagram of a low confidence circuit in accordance with an exemplary embodiment of the present invention.

FIG. 5 is a diagram of a low confidence circuit 500 in accordance with an exemplary embodiment of the present invention. The low confidence signal indicates that there is not enough motion for the cadence to be broken, but the cadence following circuit can still actively follow the cadence. The LOW_CONFIDENCE signal goes true when:

1) The current bit in the MOTION_CNT_BITMAP is a zero, and the frame motion is less than the minimum threshold, MOTION_CNT_MIN_THR.

2) The change in the field motion is less than the threshold.

Figure 6:
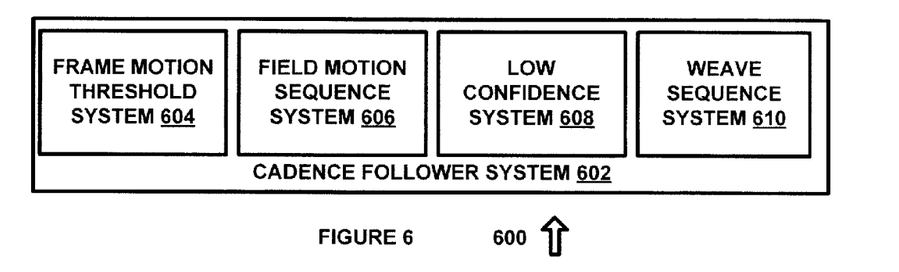
FIG. 6 is a diagram of a system for determining a break in cadence in accordance with an exemplary embodiment of the present invention.

FIG. 6 is a diagram of a system 600 for determining a break in cadence in accordance with an exemplary embodiment of the present invention. System 600 includes cadence follower system 602 and frame motion threshold system 604, field motion sequence system 606, low confidence system 608 and weave sequence system 610, each of which can be implemented in hardware, software or a suitable combination of hardware and software and which can be one or more software systems operating on a general purpose processing platform.

Frame motion threshold system 604 receives data for two or more successive fields of data and determines whether the difference between two successive fields exceeds a maximum threshold or has exceeded a minimum threshold wherein the field difference should be low. In one exemplary embodiment, frame motion threshold system 604 can compare fields from successive frames (e.g., fields separated by one intervening field) in a suitable cadence system, such as a 3:2 cadence system, such that the sequence of values generated by a frame motion threshold system 604 has a predetermined known sequence, such as low, high, high, high, high, where the low value is expected to occur where a field is being compared to the same field (e.g., the first B0 field and the second B0 field in FIG. 1). In this exemplary embodiment, for any sequence value that exceeds a scene change threshold, a cadence break signal can be generated. Likewise, where a sequence should have a low value and exceeds the minimum motion threshold, a signal indicating a break in cadence can be generated. In one exemplary embodiment, frame motion threshold system 604 can receive a frame motion bitmap indicating allowable frame motion values.

Field motion sequence system 606 determines whether a change in field motion is positive when it should be negative or whether a change in field motion is negative when it should be positive. As shown in FIG. 2, comparing differences in field values between successive sets of field values can generate a sequence of positive and negative field component changes, such that any break in the predetermined sequence indicates a break in cadence. In one exemplary embodiment, field motion sequence system 606 can receive a field motion sequence bitmap indicating allowable field motion sequence values.

Low confidence system 608 generates a low confidence control to allow a de-interlacer to use an internal weave decision process instead of an external interpolation control. In one exemplary embodiment, when frame or field differences are below minimum threshold values, there may not be sufficient data to determine whether a break in cadence has occurred. In such circumstances, a de-interlacer can use a predetermined weave determination process to weave successive fields.

Weave sequence system 610 generates weave sequence control data for a de-interlacer to control a weave sequence based on the expected sequence of fields. In one exemplary embodiment, weave sequence system 610 can receive a weave sequence bitmap and can generate weave sequence control data based on the weave sequence bitmap.

In operation, system 600 allows a break in cadence to be detected utilizing a dedicated system that does not require additional processing by a video processor control system that performs general video processor functions. System 600 thus allows a break in cadence to be detected before noticeable image artifacts are generated.

Figure 7:
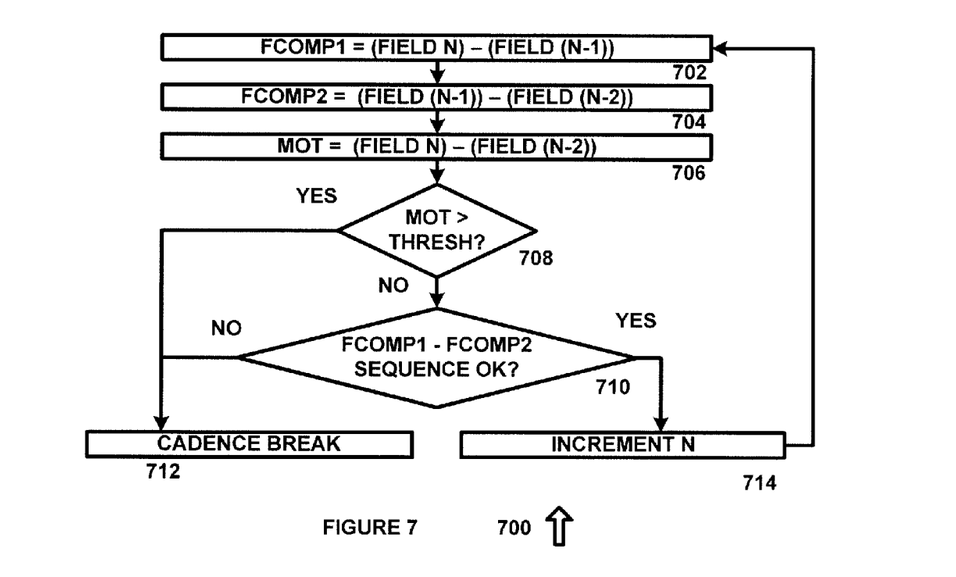
FIG. 7 is a diagram of a method for detecting a break in cadence in accordance with an exemplary embodiment of the present invention.

FIG. 7 is a diagram of a method 700 for detecting a break in cadence in accordance with an exemplary embodiment of the present invention. Method 700 begins at 702 where an FCOMP1 value is generated by determining the difference between a first field and a second consecutive field. In one exemplary embodiment, the difference can be determined by averaging pixel values in corresponding locations in two adjacent lines of one frame and subtracting the corresponding pixel value between the two lines from the subsequent or previous frame, and summing the differences. Other suitable processes can also or alternatively be used. The method then proceeds to 704 where an FCOMP2 value is determined by determining the difference between the second field and a third consecutive field, such as using the process previously described. The method then proceeds to 706.

At 706, a MOT value is determined by comparing the first field with the third field. In one exemplary embodiment, the number of corresponding pixels having a different value can be summed to generate the motion value, or other suitable processes can also or alternatively be used. The method then proceeds to 708.

At 708, it is determined whether the MOT value exceeded a threshold value. In one exemplary embodiment, the threshold can be a scene change threshold that indicates that a scene change has occurred, which causes a break in cadence. Likewise, the threshold can be a minimum motion threshold where the expected value of MOT should be low. In another exemplary embodiment, a frame motion bitmap can be used to determine whether the expected value of MOT should be below the minimum motion threshold, or other suitable processes can also or alternatively be used. If it is determined that MOT exceeds the threshold value, the method proceeds to 712 and a cadence break indication is generated. Otherwise, the method proceeds to 710.

At 710, the difference between FCOMP1 and FCOMP2 is compared to an expected sequence of differences. In one exemplary embodiment, a field sequence bitmap can be used to determine the expected field sequence, or other suitable processes can also or alternatively be used. If it is determined that the sequence is not following a predetermined expected sequence, the method proceeds to 712, otherwise the method proceeds to 714 and the fields are incremented, such as by receiving a successive field and shifting the second field to the first field and the third field to the second field. The method then returns to 702.

In operation, method 700 allows a cadence break to be detected without requiring processing resources from a video processor. Method 700 can be implemented in software, such as in suitable software processor architectures that do not result in delays from microprocessor control and access to registers, which can result in noticeable image artifacts if cadence is broken.

Although exemplary embodiments of an apparatus of the present invention have been described in detail herein, those skilled in the art will also recognize that various substitutions and modifications can be made to the apparatus without departing from the scope and spirit of the appended claims.

What is claimed is:

1. A system for cadence break detection comprising:
a field system configured receiving a plurality of fields of image data, each field of image data including sequence data for indicating a film to video conversion sequence cadence, and for generating a film to video conversion sequence cadence data; and
a cadence following circuit configured to receive the film to video conversion sequence data and to generate a cadence break signal comprising:
a threshold system configured to generate the cadence break signal if a difference in two fields exceeds a predetermined threshold;
a sequence system configured to generate the cadence break signal if a sequence of difference between the plurality of fields does not match a predetermined sequence; and
a free run counter configured to receive a field end signal and sequence number data and to generate a plurality of bitmap select fields.

2. The system of claim 1 wherein the threshold system comprises a field maximum threshold system generating a cadence break signal if a difference in two fields exceeds a predetermined maximum threshold.

3. The system of claim 1 wherein the threshold system comprises a field minimum threshold system generating a cadence break signal if a difference in two fields exceeds a predetermined minimum threshold.

4. The system of claim 1 further comprising a weave direction bitmap identifying whether a first field should be combined with a previous field or a subsequent field.

5. The system of claim 1 further comprising a frame motion bitmap identifying whether a field difference can exceed a threshold.

6. The system of claim 1 further comprising a field motion change bitmap identifying whether a difference between two field comparison values should be positive or negative.

7. The system of claim 1 further comprising a low confidence system generating low confidence data based on the plurality of fields of image data and providing the low confidence data to a de-interlacer.

8. The system of claim 1 further comprising a FUTURE_PAST_BITMAP configured to receive one of the plurality bitmap select fields and to generate control data to cause one of a future fields or a past field to be woven into a current field in a de-interlacer.

9. The system of claim 8 further comprising:
a MOTION_CNT_BITMAP configured to receive one of the plurality bitmap select field and to generate an indictor representing whether a frame motion value is expected to be high on a predetermined field; and
a FCOMP BITMAP configured to receive one of the plurality bitmap select fields and to generate an indicator representing whether a change in field motion in the predetermined field is expected to be negative or positive.

10. A method for cadence break detection comprising:
receiving a plurality of fields of image data, each field of image data including sequence data for indicating a film to video conversion sequence cadence;
receiving a field end signal and sequence number data and to generate a plurality of bitmap select fields generating a film to video conversion sequence cadence data;
determining a difference between two of the fields of image data;
generating cadence break data if the difference between the two fields of image data exceeds a predetermined threshold as a function of the film to video conversion sequence cadence data; and
generating the cadence break data if a difference between a first difference between two of the fields of image data and a second difference between two of the fields of image data does not match predetermined sequence data.

11. The method of claim 10 further comprising generating low confidence data based on the image data.

12. The method of claim 10 wherein generating the cadence break data if the difference between the two fields of image data exceeds the predetermined threshold comprises generating the cadence break data if the difference between the two fields of image data exceeds a scene change threshold.

13. The method of claim 10 wherein generating the cadence break data if the difference between the two fields of image data exceeds the predetermined threshold comprises generating the cadence break data if the difference between the two fields of image data exceeds a minimum motion threshold.

14. The method of claim 10 wherein determining the difference between two of the fields of image data comprises summing the number of pixels in one of the two fields of image data that are different from corresponding pixels in the other of the two fields of image data.

15. The method of claim 10 wherein the first difference between two of the fields of image data is determined by averaging corresponding pixels in two adjacent lines of one of the two fields of image data and subtracting the average from a corresponding pixel in the other of the two fields of image data.

16. A system for cadence break detection comprising:
a field system receiving a plurality of fields of image data;
a processor configured to generate a cadence break signal if a difference in two fields exceeds a predetermined threshold;
the processor further configured to generate the cadence break signal if a sequence of differences between the plurality of fields does not match a predetermined sequence; and
a free run counter configured to receive a field end signal and sequence number data and to generate a plurality of bitmap select fields.

17. The system of claim 16 further comprising means for generating a cadence break signal if a difference in two fields exceeds a predetermined maximum threshold.

18. The system of claim 16 further comprising means for generating a cadence break signal if a difference in two fields exceeds a predetermined minimum threshold.

* * * * *